UNITED STATES PATENT OFFICE.

HENRI DELPORTE, FILS, OF OUGRÉE, BELGIUM, ASSIGNOR TO EISEN-UND STAHLWERK HOESCH, AKTIENGESELLSCHAFT, OF DORTMUND, GERMANY.

PROCESS FOR MANUFACTURING STEEL.

No. 861,440.　　　　Specification of Letters Patent.　　　　Patented July 30, 1907.

Application filed January 2, 1906. Serial No. 294,329.

*To all whom it may concern:*

Be it known that I, HENRI DELPORTE, Fils, a subject of the King of Belgium, and residing at Ougrée, Liege, Belgium, have invented a new and useful Improvement in the Process of Manufacturing Steel in the Siemens-Martin Furnace, of which the following is a specification.

According to this invention the process of refining iron in a Siemens-Martin furnace is conducted in two or more stages for facilitating the refining. The furnace first receives the ore and limestone or lime or other material to aid the refining, and is then charged with pig iron and scrap, or with pig iron alone in solid or liquid state, but preferably liquid. During the process more refining materials are added if necessary.

When by the reaction of the materials present the greater part of certain of the impurities in the iron, particularly silicon, phosphorus and sulfur have been removed, the partly refined metal is withdrawn as by being tapped into a ladle and the slags are run out of the furnace. Then the furnace is again charged with ore and limestone or lime or other additions according to the requirements, and the liquid metal in the ladle is poured back into the furnace. In this second stage of the process, metal already highly refined, comes in contact with fresh refining material in a furnace free from slag, and the action of such material is rapid and thorough. The impurities and particularly phosphorus are in this manner easily removed.

It is obvious that the withdrawal of the metal and its re-introduction into the cleaned furnace may be repeated as often as is advantageous.

What I claim is,—

The process substantially as hereinbefore set forth of refining pig iron in a single furnace, which consists in charging the furnace with the ore and refining material, withdrawing the partially refined metal from the furnace, removing the slag therefrom, recharging the furnace, and returning the partially refined metal to the same furnace, whereby the partially refined metal comes in contact with fresh refining material free from slag.

In witness whereof, I have hereunto signed my name in the presence of two subscribing witnesses.

H. DELPORTE, FILS.

Witnesses:
　MARCEL ROCHE,
　A. SCHRAY.